United States Patent [19]

Ingram

[11] 4,383,627
[45] May 17, 1983

[54] LUGGAGE RACK LOCKING DEVICE

[75] Inventor: Charles E. Ingram, Warren, Mich.

[73] Assignee: Four Star Corporation, Troy, Mich.

[21] Appl. No.: 195,206

[22] Filed: Oct. 8, 1980

Related U.S. Application Data

[63] Continuation of Ser. No. 913,662, Jun. 8, 1978, abandoned.

[51] Int. Cl.³ .................... B60R 9/00; B60R 9/04
[52] U.S. Cl. .................................. 224/315; 70/237; 224/324
[58] Field of Search ............... 224/324, 326, 315, 281, 224/321; 248/225.4, 225.3 R, 551, 553; 70/237, 52, 54; 410/150

[56] References Cited

U.S. PATENT DOCUMENTS

| | | | |
|---|---|---|---|
| 2,891,490 | 6/1959 | Elsner | 410/105 |
| 3,354,416 | 1/1971 | Bott | 224/321 |
| 3,370,446 | 2/1968 | Francis | 248/553 X |
| 3,415,477 | 12/1968 | Kondur, Jr. | 248/225.4 X |
| 4,015,760 | 4/1977 | Bott | 224/324 |
| 4,020,662 | 5/1977 | Fowler | 70/237 |
| 4,055,284 | 10/1977 | Bott | 224/326 |
| 4,132,335 | 1/1979 | Ingram | 224/324 |

FOREIGN PATENT DOCUMENTS 2713804 11/1977 Fed. Rep. of Germany ...... 224/326

*Primary Examiner*—Allan N. Shoap
*Attorney, Agent, or Firm*—Reising, Ethington, Barnard, Perry & Brooks

[57] ABSTRACT

A luggage rack of the type having a tracked slat has a locking device associated therewith. The locking device is removably mounted to the end of the slat. The locking device includes a cylinder lock or similar locking member which urges a wedge member into a locking mode to prevent the locking device from being removed from the end of the slat. The locking device prevents unauthorized removal of article carriers from the slat.

2 Claims, 5 Drawing Figures

LUGGAGE RACK LOCKING DEVICE

This is a continuation of application Ser. No. 913,662, filed June 8, 1978, now abandoned.

BACKGROUND OF THE INVENTION

I. Field of the Invention

The present invention pertains to locking devices. More particularly, the present invention pertains to locking devices for luggage racks and simular article carriers. Even more particularly, the present invention concerns end mounted locking devices for slats of luggage racks or article carriers.

II. Prior Art

In co-pending U.S. patent application No. 836,966, entitled "SLIDING BRACKET FOR RACK", filed Sept. 27, 1977, now U.S. Pat No. 4,132,335 issued Jan. 2, 1979 the disclosure of which is hereby incorporated by reference, there is disclosed therewithin a tie-down bracket for use with an article carrier. Generally, this co-pending application teaches an article carrier comprising a plurality of vehicular mounted slats having tracks formed therewithin. A tie-down bracket is slidably mounted onto the track for adjustably positioning bracket for accommodating various types of articles to be transported upon the article carrier or rack.

It is to be appreciated that, conceivably, unauthorized removal of the brackets could occur thereby resulting in the theft of the article.

Indeed, this unauthorized theft could occur with simular type article carriers. Hence, there is a need within the art for means and modes whereby such unauthorized removal of the tie-down bracket can be prevented. It is to this to which the present invention is directed.

STATEMENT OF RELEVANT ART

To the best of applicant's knowledge the most closely related art is that found in the above-identified co-pending application as well as U.S. Pat. No. 4,015,760.

SUMMARY OF THE INVENTION

In accordance with the present invention there is provided a locking device adapted to be removably mounted onto the end of a luggage rack or article carrier slat. The locking device hereof comprises a housing which is slidable onto the end of a slat. The housing includes a guide plate which slides within a track formed within the slat. The guide plate also functions as a stop to limit the depth or extent of the slidability of the locking device in the track.

The locking device hereof further comprises a locking means, such as a cylinder lock or the like, which is disposed in a substantially vertical mode. Projecting downwardly from the lock is a shaft or similar rod which has a wedge member fixedly secured thereto. The wedge member is disposed substantially perpendicular to the rod. In accordance herewith the rod is rotatable in response to the rotation of the cylinder of the cylinder lock. Because the wedge member is carried by the rod it, also, rotates in response to the rotation of the rod. Rotation of the rod forces the wedge member into forced frictional engagement with the side wall of the track of the slat thereby locking the device onto the end of the slat.

Positioning of the locking device prevents unauthorized removal of an article carrier tie-down bracket or the like from the slat.

The present invention further defines an article carrier having the locking device hereof incorporated therewith.

For a more complete understanding of the present invention references made to the following detailed description and accompanying drawing. In the drawing like reference characters refer to like parts throughout the several views in which:

DESCRIPTION OF THE PREFERRED EMBODIMENT

Figure 1:
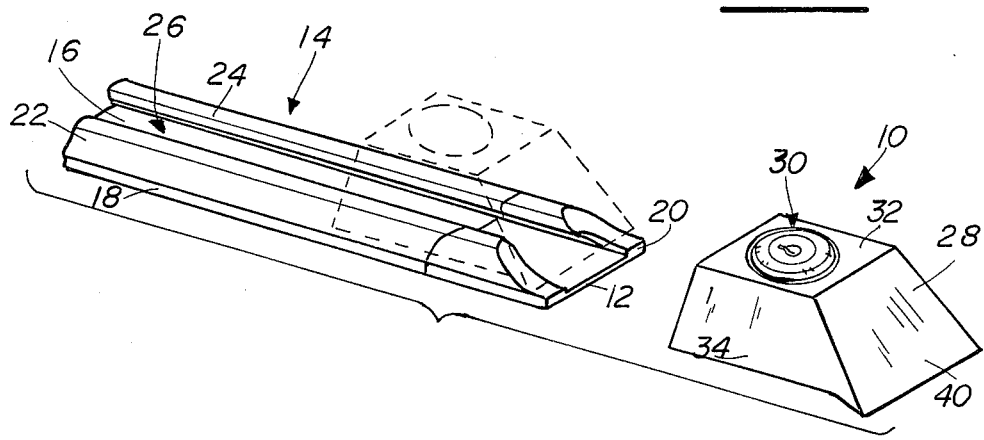
FIG. 1 is an exploded, perspective view, partly in phantom, depicting the locking device and an associated luggage rack or article carrier slat in combination therewith.

Now, and with reference to the drawing, there is depicted therein a locking device, generally, denoted at 10, in accordance with the present invention. The locking device 10 hereof is adapted to be removably mounted onto an end 12 of a slat 14.

At the outset, it should be noted, that the slat 14 of the type under consideration herein comprises a substantially planar base 16 having upstanding side walls 18, 20. The side walls extend upwardly from the base and are spaced apart, parallel and coextensive. Integrally formed with the side walls are inwardly projecting top walls 22, 24. The top walls are in opposed relationship. As clearly shown in FIG. 1 the walls of the slat cooperate to define a substantially inverted T-shaped track 26. This type of slat is more particularly disclosed in the above referred to co-pending application. Furthermore, it should be noted with respect hereto that the slat comprises a luggage rack or article carrier which is mounted onto a section of a vehicle. Ordinarily, the luggage rack is mounted onto the roof of a vehicle. However, such racks can be mounted onto the deck lid of the trunk or the like. The portion of the vehicle to which the rack or carrier is mounted is not critical hereto. Furthermore, it should be noted with respect hereto that the exact configuration of the track is not limitative of the present invention. Thus, the present invention can accommodate the dove tail configuration of the track of U.S. Pat. No. 4,015,760 or simular configurations. However, the T-shaped configuration is particularly amenable to the practice of the present invention.

Referring, again, to the drawing the locking device 10 hereof comprises a housing 28 and a locking member 30 associated therewith. More particularly, the housing 28 comprises a top wall 32 a pair of, spaced apart, parallel, downwardly depending side walls 34, 36, a forward wall 38 which depends downwardly from the top wall and a rear wall 40. Forward wall 38 includes a vertically or upwardly relieved portion 39 which has a cross sectional shape corresponding to that of slat 14 whereby housing 28 may slip upon the slat without interference by said forward wall. The side walls, rear wall and forward wall are integrally formed with the top wall and depend downwardly therefrom, as shown. The walls are integrated to form a substantially unitary member. It should be noted with respect hereto that the rear wall 40 is depicted as being sloped. However, this sloped configuration is provided solely for aesthetic purposes and is not to be construed as limitative of the present invention. The housing defined by the walls is a hollow interior open bottomed housing.

The locking member 30 is fixedly mounted to the top wall 32 of the housing and projects downwardly therefrom into the interior of the housing, as shown. The locking member, preferably, comprises a conventional cylinder lock 42. As is known to those skilled in the art to which the invention pertains a cylinder lock comprises, usually, a pair of concentric cylinders 44, 46 which define an inner cylinder and an outer cylinder. The inner cylinder is rotatable with respect to the outer cylinder about the common axis when in the unlocked mode.

Ordinarily, a plurality of pins project into the center of the inner cylinder, as shown. The pins are biassed into the projected state via biassing means 50, associated therewith. The biassing means are disposed in partial bores or openings formed in the outer cylinder and which register with openings formed in the inner cylinder. When in the projected state the pins are interposed in the inner and outer cylinders. Thus, the pins prevent rotation of the inner cylinder. Upon insertion of a key into the center or key-way of the inner cylinder the pins are thrust into the bores associated therewith against the bias of the biassing means or springs. This enables rotation of the inner cylinder. Again, the operation of such cylinder locks is known to the skilled artisan. The previous discussion has been provided for purposes of illustration. It is to be understood that any such conventional cylinder lock or simular locking member can be utilized in the practice of the present invention.

Figure 3:
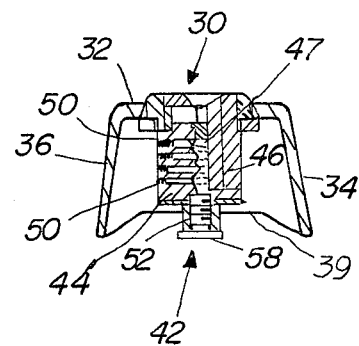
FIG. 3 is a cross-sectional view taken along the line 3—3 of FIG. 1.

As clearly shown in FIG. 3 projecting downwardly from the inner cylinder is a rod 52. The rod has one end fixedly secured to the inner cylinder. Because of the fixing of the rod to the cylinder the rod rotates therewith. Fixedly secured to the rod and projecting laterally outwardly therefrom is a wedge member 58. Again, because the wedge member is fixedly mounted to the rod it, likewise, rotates in response to rotation of the cylinder. The wedge member is adapted to be urged into wedging relationship with the side wall of the slat to lock the locking device onto the end of the slat in a manner to be described subsequently.

The rod and wedge assembly extends downwardly and laterally outwardly, respectively, from the cylinder lock a predetermined distance such that upon mounting the locking device onto the end of the slat the wedge member is disposed in the track, as shown. Furthermore, the wedge member is provided with a length sufficient to insure its engagement with the wall of the track upon rotation of the cylinder.

Figure 2:
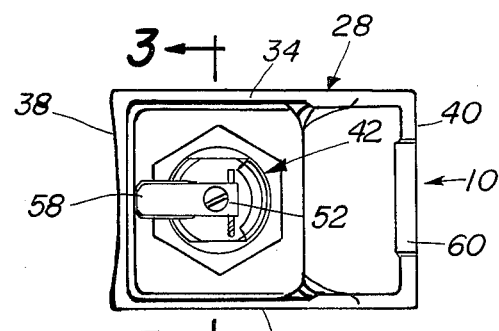
FIG. 2 is a bottom plan view of the locking device of the present invention.

As shown in FIG. 2 a guide plate 60 is formed on the bottom of the rear wall and projects forwardly therefrom. The guide plate 60 defines a guide means for inserting the locking device into the track. Ordinarily, the end 12 of the slat 14 includes a track which is in registry with the track formed in the slot.

Figure 4:
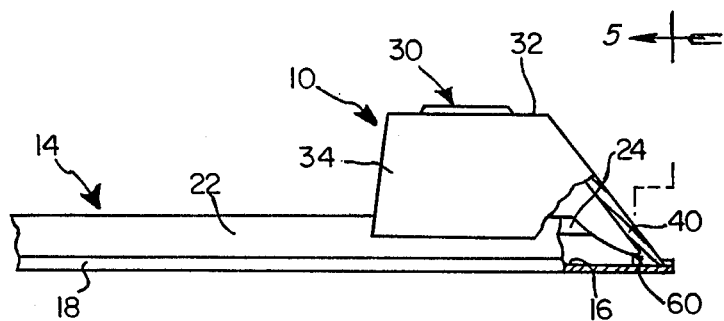
FIG. 4 is a partially sectioned side elevation showing the locking device mounted on the slat.
Figure 5:
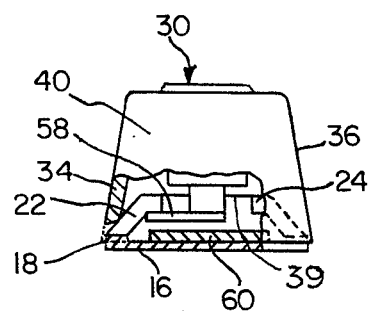
FIG. 5 is a partially sectioned end view along line 5—5 of FIG. 4.

In utilizing the present locking device, as best seen in FIGS. 4 and 5 the locking device 10 is slid into the track via the guide plate 60. The locking device is slid into the track to the position desired. Then, a key or simular unlocking means is utilized to rotate the cylinder of the lock 30. Rotation of the cylinder causes the wedge member to rotate in a likewise direction. This rotation causes the wedge member to be forced into engagement with the interior surface of the side wall 20 or 22 of the slat. This wedging engagement locks the locking device into position in the track. Thus, a tie-down bracket or the like can not be slid off the end of the slat. Thus, the locking device precludes unauthorized removal of the brackets and, thus, the articles carried thereby.

It should also be noted with respect hereto that the end 12 of the slat 14 can be provided with a slanted interior base, as shown. This slanted base then intersects the base of the track at an acute angle. Because the guide plate is a substantially flat, planar member formed of rigged materials it can not flex past the junction of the track and the end of the slat thereby limiting the degree of insertion in the tract of the locking device, if desired.

In manufacturing the present locking device rigged materials such as hardened steel, brass or the like can be utilized. This prevents breakage of the locking device and easy removal thereof.

As heretofore noted the exact configuration of the track is not critical hereto. It is the urging of the wedge member into engagement with the side wall of the track to prevent the unauthorized removal of the locking device which is of importance hereto.

Having, thus, described the invention what is claimed is:

1. A lock for a vehicle associated slat having a track formed therein, the track having upstanding side walls terminating in inwardly projecting top walls, the lock comprising:
    (1) a housing, said housing comprising:
        (a) a top wall,
        (b) a pair of spaced apart side walls depending from said housing top wall,
        (c) a forward wall,
        (d) a rear wall, each of the housing walls being integrally formed to define said housing, the bottom edges of each of the housing walls riding upon the slat,
        (e) a guide plate formed integrally with said housing gear wall and projecting inwardly therefrom toward said housing forward wall, said guide plate being insertable into said track subadjacent the inwardly projecting top walls of the slat, said rear wall adapted to abut an end of the track to limit the movement of the housing along the track,
    (2) a locking means movable between a locking position and an unlocked position, said locking means secured to the top wall of the housing and projecting downwardly therefrom,
    (3) a wedge member interconnected to said locking means and movable therewith, said wedge member being attached to the free end of said locking means and projecting below said bottom edges of said housing walls, said wedge member being disposable in said track, and wherein said wedge member is movable into engagement with at least one of the side walls of said track by movement of said locking means to fix said lock in position.

2. A lock for a vehicle as set forth in claim 1 wherein the locking means comprises a rotatable key-operated cylinder lock.

* * * * *